May 9, 1944.  G. LIVELY  2,348,485
VEHICLE SPRING SUSPENSION
Filed Oct. 4, 1941  2 Sheets-Sheet 1
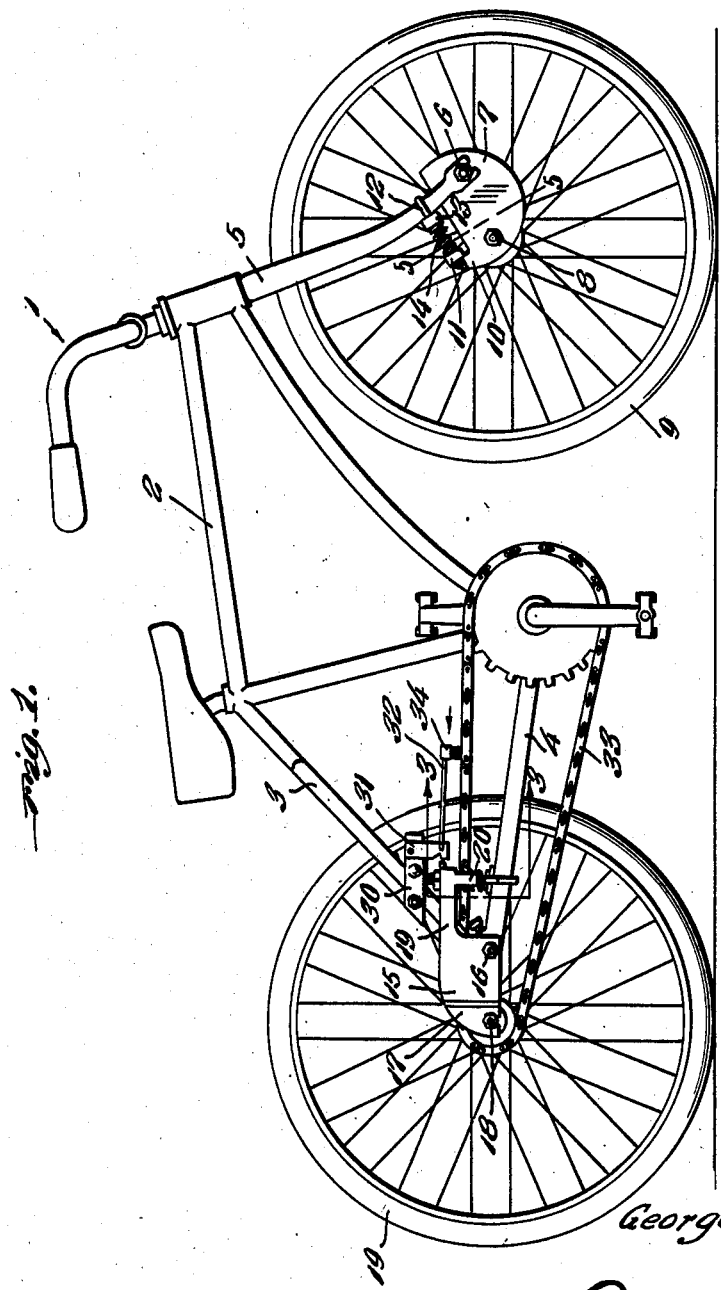
Inventor
George Lively
By Clarence A. O'Brien
Attorney May 9, 1944. G. LIVELY 2,348,485
VEHICLE SPRING SUSPENSION
Filed Oct. 4, 1941 2 Sheets-Sheet 2
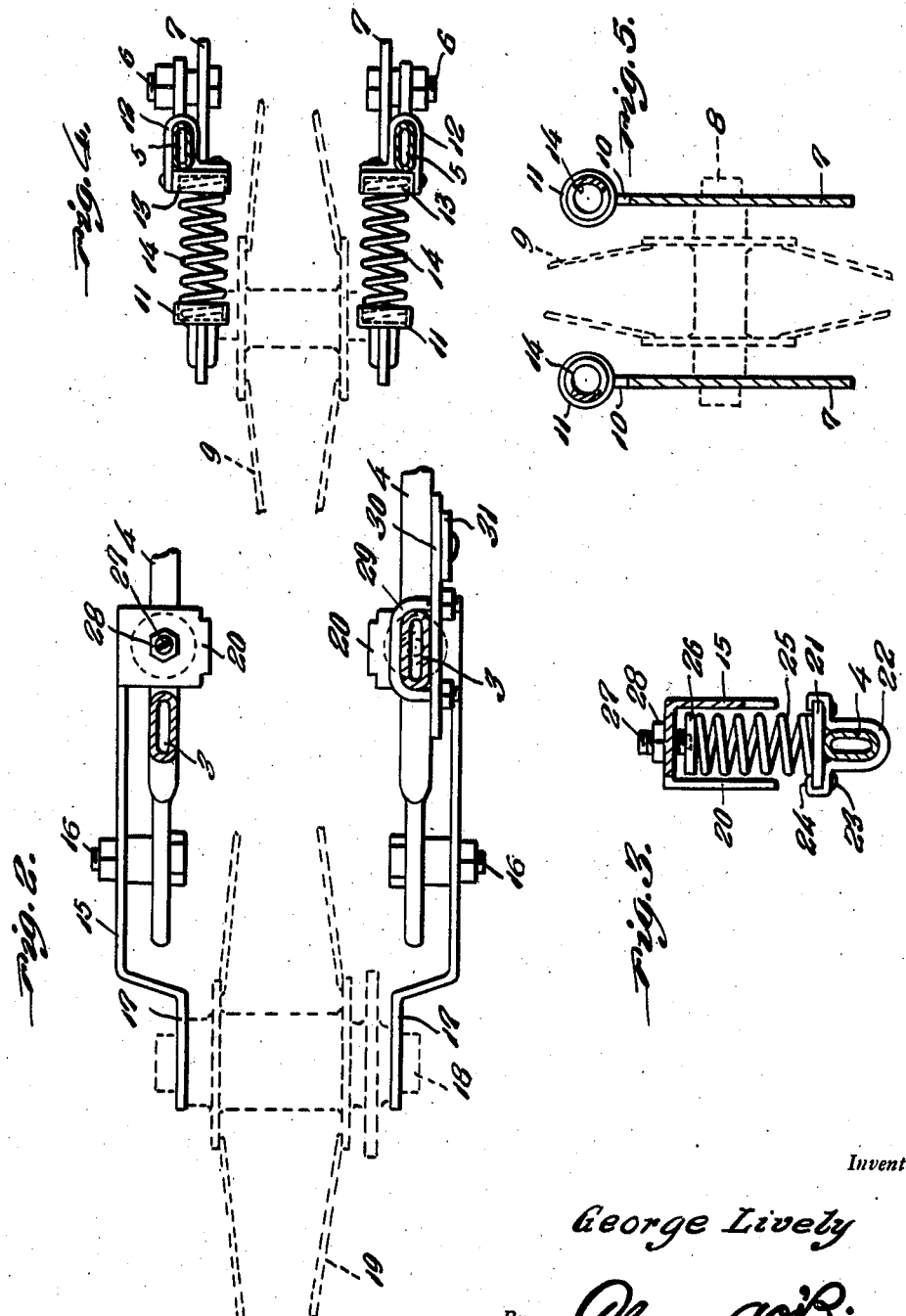
Inventor.
George Lively
By Clarence A. O'Brien
Attorney Patented May 9, 1944

2,348,485

UNITED STATES PATENT OFFICE 2,348,485

VEHICLE SPRING SUSPENSION

George Lively, Farmington, N. Mex., assignor of one-half to Harold D. Tanner, Farmington, N. Mex.

Application October 4, 1941, Serial No. 413,669

1 Claim. (Cl. 280—277)

The present invention relates to new and useful improvements in spring suspensions particularly for bicycles and motorcycles, although it will be understood, of course, that the invention may be used on any other type of vehicle for which it may be found adapted and desirable.

The primary object of the present invention is to provide, in a manner as hereinafter set forth, novel means for absorbing shock from bumps or irregularities encountered in the surface over which the vehicle is traveling, thus assuring a comparatively smooth, level ride.

Another very important object of the invention is to provide unique means for rendering the springs inoperative when desired such, for example, as when the brakes are applied, thereby preventing hammering or chattering of the wheels on the highway.

Other objects of the invention are to provide a vehicle spring suspension of the character described which will be comparatively simple in construction, strong, durable, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a bicycle, the front and rear wheels of which are equipped with spring suspensions in accordance with the present invention.

Figure 2 is a view in horizontal section through the rear portion of the bicycle frame, showing the rear suspension in top plan.

Figure 3 is a cross sectional view through one side portion of the rear wheel suspension, taken substantially on the line 3—3 of Figure 1.

Figure 4 is a top plan view of the front wheel suspension, showing the fork of the bicycle in horizontal section.

Figure 5 is a sectional view, taken substantially on the line 5—5 of Figure 1.

Referring now to the drawings in detail, it will be observed that reference numeral 1 designates generally a bicycle comprising a frame 2, said frame including rear forks 3 and 4 and a front fork 5.

Pivotally mounted at 6 for swinging movement in a vertical plane between the lower end portions of the front fork 5 is a pair of spaced, opposed segmental plates 7 of suitable metal. Extending between the plates 7 at a point rearwardly of the pivots 6 is an axle 8. The front wheel 9 of the bicycle is journaled on the axle 8. It will thus be seen that the front wheel 9 is mounted for rotary and swinging movement in the fork 5.

Rising from the rear end portions of the substantially segmental swinging plates 7 are integral lugs 10. Cups 11 are firmly secured in position on the lugs 10. It will be observed that the cups 11 face the front of the vehicle.

Secured by clamps 12 on the front fork 5 of the bicycle are cups 13 which are opposed to the cups 11. The cups 11 and 13 are for the reception of the end portions of coil springs 14 which yieldingly resist upward swinging movement of the rear ends of the segmental plates 7.

It is thought that the manner in which the front spring suspension hereinbefore described will be readily apparent. Briefly, the rear ends of the plates 7 with the front wheel 9 thereon are caused to swing upwardly relative to the front fork 5 under the load. This action is yieldingly resisted by the coil springs 14. It will thus be seen that the front wheel is floatingly mounted in the fork 5 in a manner to absorb shock and irregularities which would otherwise be transmitted to the frame of the bicycle.

The rear suspension comprises a pair of metallic plates 15 which are pivotally secured, as at 16, to the joint between the rear forks 3 and 4 of the bicycle frame 2. The plates 15 terminate in inwardly offset rear end portions 17 between which an axle 18 extends. Notches in the lower edges of the portions 17 of the plates 15 accommodate the axle 18. The rear wheel 19 of the bicycle 1 is mounted on the axle 18. It will be observed that the wheel 19 comprises a coaster brake.

Projecting forwardly from the upper portions of the pivoted ends of the plates 15 are lugs or arms 19. Depending from the forward end portions of the arms 19 are inwardly offset substantially U-shaped members 20 which, as illustrated to advantage in Figures 2 and 3 of the drawings, are positioned above the arms of the fork 4.

Cups 21 are secured by U clamps 22 on the fork 4. Screws 23 secure the cups 21 to the clamps 22. Then, the clamps 22 terminate in inturned hooks or the like 24 which are engaged over the tops of the cups 21.

The cups 21 are for the reception of the lower end portions of vertical coil springs 25. The coil springs 25 extend upwardly between the legs of the U-shaped members 20 and have their upper ends engaged in inverted cups 26 which are mounted on set screws 27 which are threaded through the upper portions of the members 20. The screws 27 permit the tension of the coil springs 25 to be conveniently regulated as desired for different loads. Lock nuts 28 secure the screws 27 in adjusted position.

Secured by a U bolt 29 on one of the arms of the fork 3 is a bracket 30. A depending latch 31 is pivotally mounted on the bracket 30. Pivotally connected to the latch 31 is a rod 32 which extends forwardly over the drive chain 33 of the bicycle 1. Mounted on the forward end of the rod 32 is a brush 34 which rides on the upper flight of the chain 33.

In operation, the plates 15 swing in a vertical plane on the pivots 16, thus floatingly supporting the frame of the bicycle on the rear wheel 19. Upward movement of the wheel 19 relative to the frame 2 is yieldingly resisted by the coil springs 25. As hereinbefore stated, this rear suspension may be conveniently adjusted for different loads through the medium of the screws 27. When the coaster brake of the bicycle is applied the usual short reverse movement of the chain 33 occurs. Thus, through the medium of the brush 34 and the arm 32, the latch 31 is engaged with the forward end of one of the arms 19 for retaining the plates 15 against swinging movement on the pivots 16. In this manner the rear wheel 19 of the bicycle is positively prevented from hammering or chattering on the highway or street, particularly when the surface is somewhat rough.

It is believed that the many advantages of a vehicle spring suspension in accordance with the present invention will be readily understood and although a preferred embodiment is as illustrated and described, it is to be understood that changes in the details of construction and in the combination and arrangement of parts may be resorted to which will fall within the scope of the invention as claimed.

What is claimed is:

In a velocipede comprising a frame including a front fork, a pair of substantially segmental metallic plates pivotally mounted for vertical swinging movement in said fork and extending rearwardly therefrom, an axle mounted between the rear portions of the plates, a wheel journaled on said axle, clamps mounted on the fork above the plates, cups mounted on said clamps at substantially right angles to the fork and facing rearwardly therefrom, lugs rising from the rear end portions of the plates, forwardly facing cups on the lugs in opposed relation to the first-named cups, and coil springs having their end portions engaged in the first and second-named cups for yieldingly resisting upward swinging movement of the plates relative to the fork.

GEORGE LIVELY.